United States Patent [19]
Hoover et al.

[11] Patent Number: 5,654,951
[45] Date of Patent: Aug. 5, 1997

[54] DYNAMIC SWITCHING SPEED CONTROL

[75] Inventors: Martin E. Hoover; Orlando J. Lacayo, both of Rochester, N.Y.

[73] Assignee: Xerox Corporation, Stamford, Conn.

[21] Appl. No.: 650,728

[22] Filed: May 20, 1996

[51] Int. Cl.$^6$ .................................................... G11B 3/74
[52] U.S. Cl. ........................ 369/97; 369/32; 369/119
[58] Field of Search ............................. 369/112, 97, 84, 369/50, 44.28, 32, 119

[56] References Cited

U.S. PATENT DOCUMENTS

| | | | |
|---|---|---|---|
| 4,320,488 | 3/1982 | Russell | 369/97 |
| 4,321,700 | 3/1982 | Russell | 369/97 |
| 5,237,521 | 8/1993 | Raj et al. | 364/561 |
| 5,268,891 | 12/1993 | Yanagidate | 369/97 |

*Primary Examiner*—Nabil Hindi
*Attorney, Agent, or Firm*—Ronald F. Chapuran

[57] ABSTRACT

An imaging system for forming multiple image exposure frames on a photoconductive member moving in a process direction including a raster output scanner forming a plurality of scanlines in a transverse direction across the width of the member by reflecting modulated beams from a plurality of facets of a rotating polygon. Hall effect magnetic sensors mounted with respect to a motor driving the polygon provide a first speed control of the polygon with the laser in a not ready or an off state and start of scan signals detecting the beginning of a scan line provide a second speed control of the polygon with the laser in an on or ready state. Circuitry or control code responds to the SOS signals and the magnetic sensors to dynamically switch between the first speed control and the second speed control.

17 Claims, 2 Drawing Sheets

DYNAMIC SWITCHING SPEED CONTROL

BACKGROUND AND MATERIAL DISCLOSURE STATEMENT

This invention relates generally to a raster output scanning system for producing a high intensity imaging beam which scans across a rotating polygon to a movable photoconductive member to record electrostatic latent images thereon, and, more particularly, to dynamic switching between start of scan (SOS) sensor and Hall sensors as feedback signals for polygon speed control.

In recent years, laser printers have been increasingly utilized to produce output copies from input video data representing original image information. The printer typically uses a Raster Output Scanner (ROS) to expose the charged portions of the photoconductive member to record an electrostatic latent image thereon. Generally, a ROS has a laser for generating a collimated beam of monochromatic radiation. The laser beam is modulated in conformance with the image information. The modulated beam is reflected through a lens onto a scanning element, typically a rotating polygon having mirrored facets.

The light beam is reflected from a facet and thereafter focused to a "spot" on the photosensitive member. The rotation of the polygon causes the spot to scan across the photoconductive member in a fast scan (i.e., line scan) direction. Meanwhile, the photoconductive member is advanced relatively more slowly than the rate of the fast scan in a slow scan (process) direction which is orthogonal to the fast scan direction. In this way, the beam scans the recording medium in a raster scanning pattern. The light beam is intensity-modulated in accordance with an input image serial data stream at a rate such that individual picture elements ("pixels") of the image represented by the data stream are exposed on the photosensitive medium to form a latent image, which is then transferred to an appropriate image receiving medium such as paper. Laser printers may operate in either a single pass or multiple pass system.

In a multiple pass system, each image area on the photoreceptor surface must make at least three revolutions (passes) relative to the transverse scanline formed by the modulated laser beam generated by a ROS system. Each image must be registered to within a 0.1 mm circle or within a tolerance of ±0.05 mm. Each color image must be registered in both the photoreceptor process direction (slow scan registration) and in the direction perpendicular to the process direction (referred to as fast scan or lateral registration).

In systems requiring such precision, speed control of the rotating polygon is essential. In pending application D/94326, U.S. Ser. No. 08/510,998 filed Aug. 3, 1995, assigned to the same assignee as the present invention, there is disclosed a control that provides a start of scan (SOS) signal for each of the facets of a rotating polygon. The control determines the facet related to the first scanline of a first image exposure frame on a photoconductive member, and initiates the first scanline of each succeeding superimposed image exposure frame on the photoconductive member in relation to the facet related to the first scanline of the first image exposure frame. A time period measurement between a given facet occurrence to the same given facet repeat occurrence, relative to subsequent full revolutions of the polygon, provides an 'error free' electronic representation of the speed of the polygon.

A difficulty, however, in the prior art is that the start of scan (SOS) signals are only provided by sensing a portion of the projected laser beam. When the laser is off, there are no light beam signals to be sensed to be able to control polygon speed. Some level of relatively inexpensive speed control is needed when the laser beam is off is necessary to be able to uniformly commence SOS control after the laser is on.

Thus, it would be desirable to provide a relatively inexpensive polygon scanning system that sufficiently controls polygon speed even if the laser scanning system is in an off state. It is an object of the present invention, therefore, to provide two levels of polygon speed control, a less precise level of speed control, such as using Hall sensors, with the laser in an off state and a very precise speed control, SOS signals, when the laser is in an on state. It is another object of the present invention to provide a first level of polygon speed control when the laser device is off to enable an easy transition to SOS signal speed control when the laser device is on. Other advantages of the present invention will become apparent as the following description proceeds, and the features characterizing the invention will be pointed out with particularity in the claims annexed to and forming a part of this specification.

SUMMARY OF THE INVENTION

There is disclosed an imaging system for forming multiple image exposure frames on a photoconductive member moving in a process direction including a raster output scanner forming a plurality of scanlines in a transverse direction across the width of the member by reflecting modulated beams from a plurality of facets of a rotating polygon. Hall effect magnetic sensors mounted with respect to a motor driving the polygon provide a first speed control of the polygon with the laser in a not ready or an off state and start of scan signals detecting the beginning of a scan line provide a second speed control of the polygon with the laser in an on or ready state. Circuitry or control code responds to the SOS signals and the magnetic sensors to dynamically switch between the first speed control and the second speed control.

For a better understanding of the present invention, reference may be had to the accompanying drawings wherein the same reference numerals have been applied to like parts and wherein:

DESCRIPTION OF THE INVENTION

Figure 1:
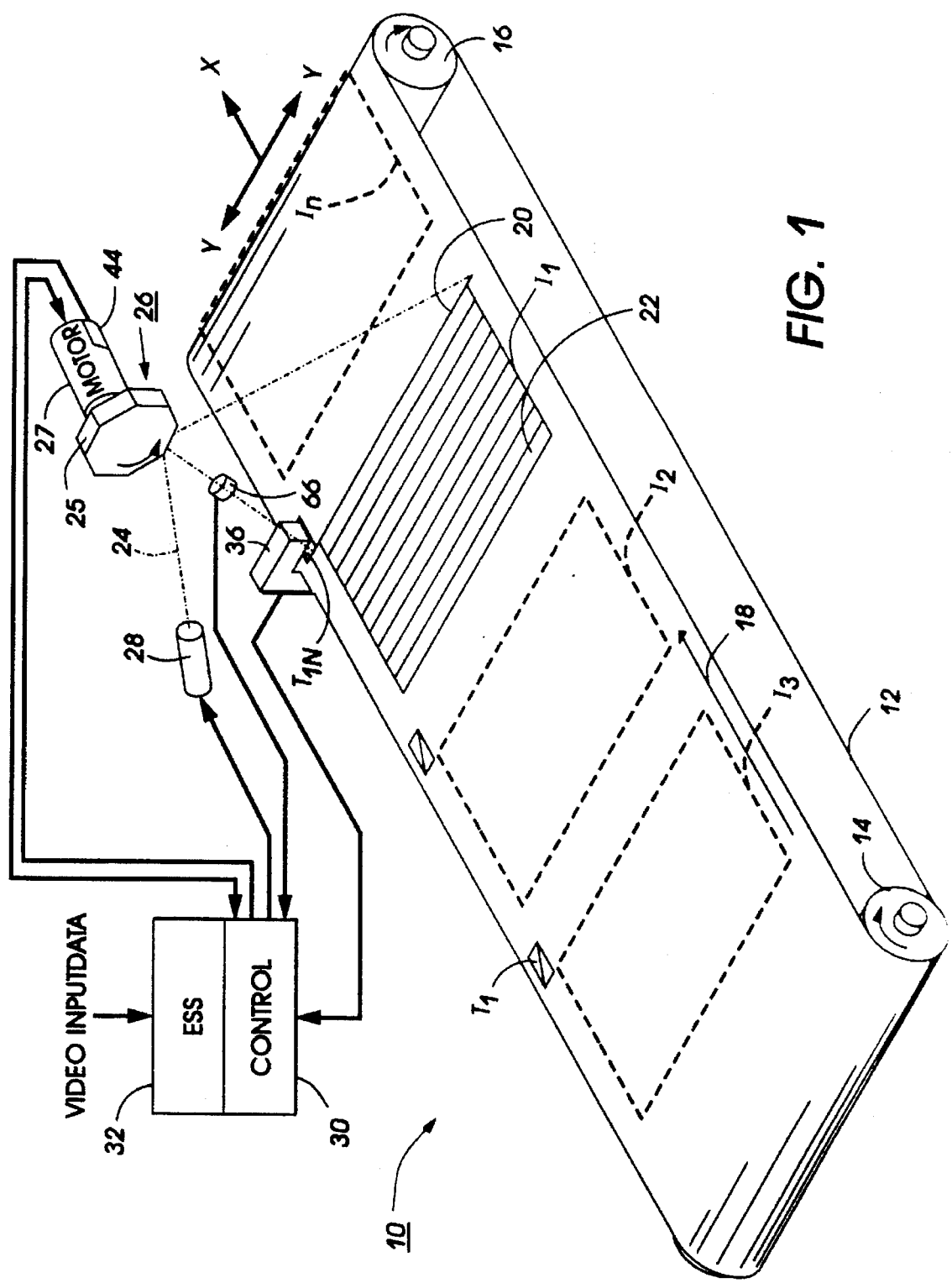
FIG. 1 shows a multi-pass ROS color printing system incorporating the present invention.

In FIG. 1 of the drawings, an embodiment of the present invention is incorporated in a multi-pass xerographic printing system depicted schematically and designated generally by reference numeral 10. It should be understood that this system is merely an example of one system incorporating the present invention and that the scope of the invention covers a wide variety of scanning systems, for example, single pass printing systems. The system 10 includes a photoreceptive belt entrained about guide rollers 14 and 16, at least one of which is driven to advance the belt 12 in a longitudinal direction of processing travel depicted by the arrow 18. The length of the belt 12 is designed to accept an integral number of spaced image areas $I_1$–$I_n$ represented by dashed line rectangles in FIG. 1. As each of the image areas $I_1$–$I_n$ reaches a transverse line of scan 20, it is progressively exposed on closely spaced transverse raster lines 22 shown with exaggerated longitudinal spacing on the image area $I_1$ in FIG. 1.

In the embodiment depicted in FIG. 1, the line 20 is scanned by a raster output scanner so that a modulated laser beam 24 is reflected to the line 20 by successive facets 25 on a rotatable polygon-shaped mirror 26 driven by motor 27 incorporating Hall sensors illustrated at 44, providing suitable feedback signals to control 30. The beam 24 is emitted by a laser device 28 such as a laser diode, operated by a laser drive module forming part of a control processor generally designated by the reference numeral 30. The processor 30 includes other not shown circuit or logic modules such as a scanner drive command circuit, by which operation of the motor 27 for rotating the polygon mirror 26 is controlled. A start of scan sensor, illustrated at 66 determines a start of scan reference point and provides suitable feedback signals to control 30.

In the operation of the system 10, as thus far described, the control 30 responds to a video signal to expose each raster line 22 to a linear segment of the video signal image. In xerographic color systems, each image area $I_1-I_n$, must be exposed in the same manner to four successive exposures, one for each of the three basic colors and black. In a multi-pass system such as the system 10, where only one raster output scanner or head is used, complete exposure of each image area requires four revolutions of the belt 12. The image areas $I_1-I_n$, are successively exposed on successive raster lines 22 as each raster line registers with a transverse scanline 20 as a result of longitudinal movement of the belt 12.

It is to be noted that the length of the transverse scan line 20 in system 10 is longer than the transverse dimension of the image areas I. Scanline length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the laser drive module. Thus, the active portion of each transverse scan line may be shifted in a transverse direction by control of the laser drive module and the transverse position of the exposed raster lines 22, and image areas $I_1-I_n$, shifted in relation to the belt 12.

Adjustment of the active portion of the transverse scanline 20 for each succeeding image is needed to assure precise longitudinal alignment or transverse registration of the succeeding images with the first image irrespective of the lateral position of the belt during exposure of the images. This operation is achieved in substantial measure by the provision of targets aligned in the direction of belt travel and of a design to facilitate generation of a signal corresponding to the location of each target. In particular and in the multi-pass system of FIG. 1, targets $T_1-T_n$ are located along a marginal edge of the belt 12 to be aligned in a longitudinal direction and are spaced to be located slightly ahead of each image areas $I_1-I_n$ or upstream from each such area in the context of belt travel. A single sensor 36 is located to be aligned with targets T1-Tn for the image area passing the transverse scanline 20 in FIG. 1.

Downstream from the exposure station, a development station (not shown) develops the latent image formed in the preceding image area. After the last color exposure, a fully developed color image is then transferred to an output sheet. An electronic Sub System (ESS) 32 contains the circuit and logic modules which respond to input video data signals and other control and timing signals, to drive the photoreceptor belt 17 synchronously with the image exposure and to control the rotation of the polygon by the motor. For further details, reference is made to U.S. Pat. Nos. 5,381,165 and 5,208,796 incorporated herein.

As illustrated any suitable marker on the photoconductive surface or belt or any suitable hole provides a reference for each projected image on the belt surface. In other words, the detection by sensor of a mark or hole in the photoconductive surface establishes the first scanline of the projected image and in a multi pass image on image system, helps to establish image on image registration. In addition, the start of scan signals indicate the scanning laser beam to be at a start of scan position with reference to the photoconductive surface.

Generally, in the prior art, with a polygon of eight facets, the detected start of scan signal for each of eight facets on a polygon are used to inject a phase shift into the polygon motor. In particular, a polygon controller monitors the SOS signals from each of the facets, as the polygon rotates, to either speed up or slow down the rotating polygon to maintain uniform rotation. Thus there is a closed loop control from the SOS detector to maintain a uniform speed of rotation of the polygon while printing the image. There is also a positional control that enables shifting SOS signals to correct image start time.

Figure 2:
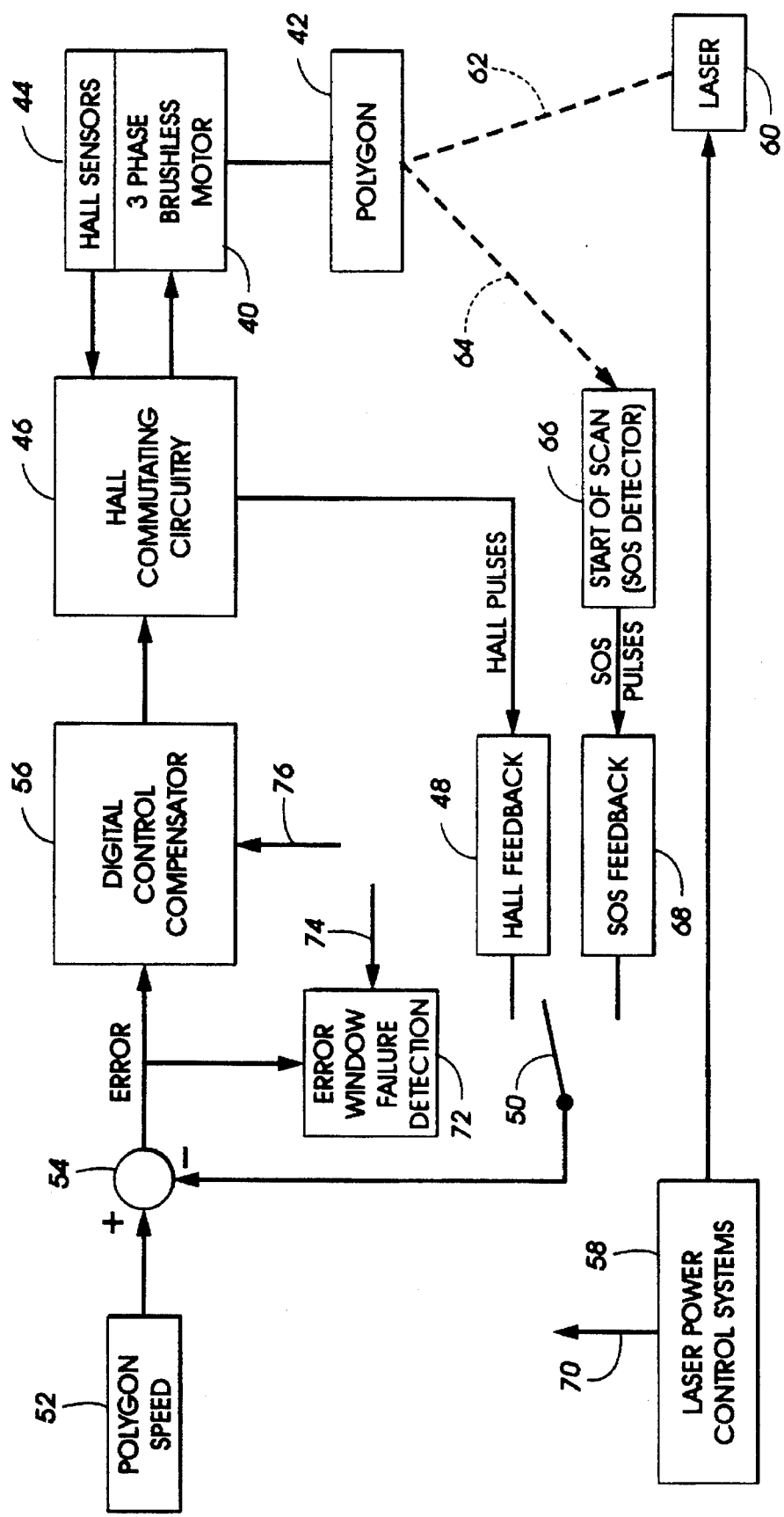
FIG. 2 illustrates a two loop polygon speed control system in accordance with the present invention.

With reference to FIG. 2, there is illustrated a dynamic switching speed control in accordance with the present invention. A three phase brushless motor 27, a typical motor for driving a rotating polygon, is shown driving polygon 42. Within the 3-phase brushless motor on a printed circuit board are the Hall sensors or magnetic switches 44 providing signals based upon the speed of the motor 40. The brushless motor 27, polygon 42, and Hall sensors 44 comprise an assembly referred to as the motor polygon assembly. The Hall sensor signals are conveyed to Hall communicating circuitry 46 to Hall feedback circuitry 48 for converting either to a frequency or period between pulses signal.

Also disclosed in FIG. 2, is a laser power control system 58 to drive laser 60 providing a laser beam 62 reflected from rotating polygon 42 providing a reflected signal to a not shown photoreceptor surface, a portion 64 of the reflected laser signal being sensed by a start of scan detector 66 providing signals to SOS feedback circuitry 68.

In accordance with the present invention, a switch 50 engages either the Hall feedback circuitry 48 or the SOS feedback circuitry 68 to provide alternate feedback source signals to a single control loop to control the speed of the polygon 42. With the switch 50 in communication with Hall feedback circuitry 48, the Hall feedback signals are conveyed to a summing junction 54 for comparing with a reference signal shown at 52. An error signal is conveyed to a digital control compensator 76 or controlling the speed of polygon 42 via the amplifier driver circuitry 46. When the laser power control system 58 is ready to drive laser 60 to reflect modulated laser beams from polygon 42 onto the moving photoreceptor surface, and appropriate signal 70 is provided to the switch 50 for the switch 50 to communicate with the SOS feedback circuitry 68.

The SOS feedback circuitry 68 is then connected to the summing junction 54 to compare the start of scan signals from start of scan circuitry 66 with reference 52 to provide a suitable error signal to digital control compensator 56 for controlling the speed for driving motor 40 to control the speed of polygon 42 via the amplifier driver circuitry 46. It should be noted the error window detect circuitry 72 and the digital control compensator circuitry 76 are adjusted depending upon whether the system is in the Hall feedback loop or the SOS feedback loop. The error window detection parameters as well as the compensator gain parameters are changed as the feedback loop is alternated between Hall feedback and SOS feedback.

Thus, there is a dynamic feedback switching control to alternate between a very high precision polygon speed and position control using start of scan signals when the laser power control system is on and a less precise Hall sensor signal feedback speed control when the laser is turned off. The Hall speed control enables the system to have a very smooth and very rapid transition to a very precise SOS speed control at the moment the laser is ready to switch to the image printing mode.

In accordance with the present invention, a system of dynamic switching between feedback sources allows the use of Start Of Scan (SOS) feedback in order to attain a higher performance motion control of a rotating polygon while at the same time overcomes the problem of loss of control upon loss of SOS signals when the laser is disabled or for some reason the SOS signal fails. Using SOS feedback attains the motion quality performance without adding a separate motion encoder feedback device as part of the polygon motor assembly (as used in previous high quality systems). This represents a considerable cost savings.

The use of SOS feedback within the polygon motor control is also needed to enable implementation of polygon rephasing involved with Image On Image (IOI) color printing. This system enables the use of SOS feedback and subsequently enables accurate phase shifting of SOS to a desired image start point. The rephase function also requires polygon control with fast response (bandwidth) in order to actuate the rephase within a short time. The motor controls that use only HALL feedback require stiff low pass filters to avoid jitter noise in the HALL signal from disturbing speed regulation. Fast responding motor rephasing is not possible with these dominant low pass filters present.

The motor control begins by spinning up the polygon and exercises control using the Hall feedback. The Hall feedback has destabilizing jitter noise and requires a lower loop gain to provide stable motor control. The limits of the error window detector are then opened up further to prevent the Hall noise from triggering interpretation of motor control regulation failure. The laser control is enabled and the laser is initialized into the on state. The recognition of the laser status is used to dynamically switch the polygon control over to the SOS signal as the feedback. The loop compensation gains are increased to provide a high bandwidth servo loop and improve motion regulation quality. The error window detection limits are reduced to enable optimal detection of motor speed regulation with tighter error limits.

Both the HALL and the SOS feedback measurements are active such that the system is able to smoothly transition between each of the two feedback sources. The digital control compensator is implemented with an integrator in parallel with proportional control such that changing the gain of the compensation does not cause disturbances of motor speed at the transition of switching feedback sources.

While the invention has been described with reference to the structure disclosed, it will be appreciated that numerous changes and modifications are likely to occur to those skilled in the art, and it is intended to cover all changes and modifications which fall within the true spirit and scope of the invention.

What is claimed is:

1. An imaging system for forming multiple superimposed image exposure frames on a photoconductive member moving in a process direction including:

a raster output scanner including a laser forming a plurality of scanlines in a transverse direction across the width of said member by reflecting modulated beams from a plurality of facets of a rotating polygon, a motor for rotating the polygon, Hall effect magnetic sensors mounted with respect to the motor for providing a first speed control of the polygon with the laser in an off state, means for detecting a beginning of a scanline and providing a start of scan (SOS) signal representing the detection, the start of scan signals providing a second speed control of the polygon with the laser in an on state, and means responsive to the SOS signals and the magnetic sensors to dynamically switch between the first speed control and the second speed control.

2. The system of claim 1 wherein the first speed control includes first compensation parameters and error window fault detection limits.

3. The system of claim 1 wherein the second speed control includes second compensation parameters and error window fault detection limits.

4. The system of claim 1 wherein the second speed control enables polygon rephasing.

5. The system claim 4 wherein polygon rephasing includes phase shifting SOS signals by a fraction of a scan line.

6. In an imaging system for forming multiple superimposed image exposure frames on a photoconductive member moving in a process direction, a method of dynamically switching between speed controls comprising the step of:

a scanner forming a plurality of scanlines in a transverse direction across the width of said member by reflecting modulated beams from a rotating polygon, providing a first speed control of the polygon, detecting a beginning of a scanline and providing a start of scan (SOS) signal representing the detection, the start of scan signals providing a second speed control of the polygon, and responding to the SOS signals to dynamically switch between the first speed control and the second speed control including the step of recognizing a not ready status of the scanner to switch to the first speed control.

7. The method of claim 6 wherein the magnetic sensors are Hall effect sensors.

8. The method of claim 6 including the step of recognizing the ready status of the scanner to switch to the second speed control.

9. The method of claim 6 wherein the first speed control includes first compensation parameters and error window detection limits.

10. The method of claim 6 wherein the second speed control includes second compensation parameters and error window detection limits.

11. The method of claim 6 wherein the second speed control includes the step of polygon rephasing.

12. The method of claim 11 wherein rephasing includes the step of phase shifting SOS signals by a fraction of a scan line.

13. The method of claim 11 wherein the scanner includes a laser power control including the step of recognizing the on status of the laser power control in switch to the second speed control.

14. The method of claim 13 including the step of recognizing the off status of the laser power control to switch to the second speed control.

15. An imaging system for forming multiple superimposed image exposure frames on a photoconductive member moving in a process direction including:

a scanner forming a plurality of scan lines in a transverse direction across the width of said member by reflecting modulated beams from a rotating polygon, a motor for rotating the polygon, Hall effect magnetic sensors mounted with respect to the motor for providing a first speed control of the polygon with the scanner not in a ready state, means for detecting a beginning of a scan line and providing a start of scan (SOS) signal representing the detection, the start of scan signals providing a second speed control of the polygon with the scanner in a ready state, and means responsive to the SOS signals and the magnetic sensors to dynamically switch between the first speed control and the second speed control.

16. The system of claim 15 wherein the first speed control includes compensation parameters and error window detection limits.

17. The system of claim 16 wherein the second speed control enables polygon rephasing.

* * * * *